United States Patent
Isobe et al.

(10) Patent No.: US 7,840,179 B2
(45) Date of Patent: Nov. 23, 2010

(54) BASE STATION, VIDEO DISTRIBUTION SYSTEM, AND DISTRIBUTION CONTROL METHOD

(75) Inventors: Shin-ichi Isobe, Yokosuka (JP); Masami Yabusaki, Kashiwa (JP)

(73) Assignee: NTT DoCoMo, Inc., Tokyo (JP)

( * ) Notice: Subject to any disclaimer, the term of this patent is extended or adjusted under 35 U.S.C. 154(b) by 712 days.

(21) Appl. No.: 11/764,458

(22) Filed: Jun. 18, 2007

(65) Prior Publication Data

US 2007/0293268 A1 Dec. 20, 2007

(30) Foreign Application Priority Data

Jun. 19, 2006 (JP) ............................. 2006-168959

(51) Int. Cl.
*H04H 40/00* (2008.01)
(52) U.S. Cl. ................ 455/3.06; 455/414.1; 455/412.2; 455/420
(58) Field of Classification Search .............. 455/414.1, 455/420, 412.1, 445, 556.2, 557, 3.05, 3.06, 455/560, 561, 466, 452.2; 725/90, 95, 32, 725/114, 115, 118, 76, 81, 109, 105; 348/400.1, 348/14.02; 705/14, 80, 5; 375/240.01, 240.06; 709/229, 231, 235, 203; 370/329, 328, 345
See application file for complete search history.

(56) References Cited

U.S. PATENT DOCUMENTS

| | | | |
|---|---|---|---|
| 6,728,965 | B1 | 4/2004 | Mao |
| 7,400,889 | B2 | 7/2008 | Balasubramanian et al. |
| 2002/0156907 | A1 | 10/2002 | Hirano et al. |
| 2004/0142691 | A1 | 7/2004 | Jollota et al. |
| 2005/0147072 | A1* | 7/2005 | Mahendran et al. ......... 370/338 |

(Continued)

FOREIGN PATENT DOCUMENTS

CN  1278389 A  12/2000

(Continued)

OTHER PUBLICATIONS

Taiwanese Office Action with English translation dated Jul. 23, 2010 in Application No. 096118556, 9 pages.

*Primary Examiner*—Jean A Gelin
(74) *Attorney, Agent, or Firm*—Oblon, Spivak, McClelland, Maier & Neustadt, L.L.P.

(57) ABSTRACT

There are a step in which, when the video data distribution request is received from the mobile station, the base station determines whether the requested video data can be distributed or not, on the basis of the wireless transmission capacity required for distributing the requested video data and the wireless transmission capacity that is available at that point of time, a step in which the base station notifies the mobile station of a result of possibility determination about distribution, a step in which, when it is determined that distribution cannot be performed, the base station sends an inquiry about a base station capable of performing distribution, to the transmitted-data capacity management device, a step in which the transmitted-data capacity management device selects base stations capable of performing the distribution, on the basis of the wireless transmission capacity required for distributing the video data and the wireless transmission capacity being used for distribution performed by a plurality of base stations, and replies with the selected base stations, and a step in which the base station notifies the mobile station of the base stations capable of performing the distribution.

7 Claims, 11 Drawing Sheets

U.S. PATENT DOCUMENTS

| | | |
|---|---|---|
| 2006/0067214 A1 | 3/2006 | Ramachandran |
| 2007/0291683 A1* | 12/2007 | Bonner et al. ............... 370/328 |
| 2008/0037472 A1 | 2/2008 | Ryu et al. |

FOREIGN PATENT DOCUMENTS

| | | |
|---|---|---|
| EP | 1 594 334 A1 | 11/2005 |
| EP | 1 638 334 A1 | 3/2006 |
| JP | 2000-124852 | 4/2000 |
| JP | 2000-216727 | 8/2000 |
| JP | 2003-153338 | 5/2003 |
| JP | 2003-209870 | 7/2003 |
| JP | 2004-328389 | 11/2004 |
| JP | 2004-336309 | 11/2004 |
| JP | 2005-79740 | 3/2005 |
| JP | 2005-323112 | 11/2005 |
| KR | 10-2002-0038018 | 5/2002 |
| KR | 10-2005-0119157 | 12/2005 |
| KR | 10-2006-0011226 | 2/2006 |
| WO | WO 99/23842 | 5/1999 |
| WO | WO 2006/041182 A1 | 4/2006 |

* cited by examiner

BASE STATION, VIDEO DISTRIBUTION SYSTEM, AND DISTRIBUTION CONTROL METHOD

BACKGROUND OF THE INVENTION

1. Field of the Invention

The present invention relates to a base station that has a function to distribute video data provided by a distribution server to a mobile station that is located within a wireless area managed by the base station, on the basis of a video data distribution request sent from the mobile station, and further relates to a video distribution system comprising the base station and the mobile station, and a distribution control method of the video distribution system.

2. Related Background Art

There has been conventionally proposed a number of technologies related to a video distribution service in an IP network (see, for example, Japanese Unexamined Patent Publication No. 2003-153338). The video distribution service has been developed recently as a service for distributing broadcast video data by using a fixed communication network in, mainly, a communication service field for fixed communication networks. A characteristic of a fixed communication network is that a receiver can exclusively use lines during distribution of video data. Therefore, distribution of a high-quality video can be realized without affecting distribution of video data to other receiver.

In contrast to the video distribution service for fixed communication networks described above, in a video distribution service for mobile communication networks, a plurality of mobile stations share the capacity of transmission of a wireless zone connecting the mobile stations to a mobile communication network, whereby a video is distributed. For this reason, in the case in which a mobile station requests for video data that has at least the available transmission capacity of the wireless zone, the transmission capacity in the wireless zone might run short, and the quality of the video distribution service for the other mobile stations sharing the transmission capacity of the wireless zone might be deteriorated.

SUMMARY OF THE INVENTION

The present invention is contrived in order to solve the problems described above, and an object thereof is to prevent quality deterioration in the video distribution service in the mobile communication network where a plurality of mobile stations share the transmission capacity of the wireless zone, so that video distribution can be performed smoothly.

In order to solve the above problems, the base station related to the present invention is a base station that has a function to distribute video data provided by a distribution server to a mobile station that is located in a wireless area managed by a base station, on the basis of a video data distribution request sent from the mobile station, and has: wireless transmission capacity managing module for managing a wireless transmission capacity that is available for distributing the video data; possibility determining module for, when the video data distribution request is received from the mobile station, determining whether distribution can be performed in response to the video data distribution request, on the basis of the wireless transmission capacity required for distributing the requested video data and the wireless transmission capacity that is managed by the wireless transmission capacity managing module and is available at this point of time; and execution control module for notifying the mobile station of a result of possibility determination about distribution, which is made by the possibility determining module, and for controlling the possibility of distribution of the video data on the basis of the result of possibility determination.

In the base station described above, the wireless transmission capacity managing module manages the wireless transmission capacity that is available for video data distribution. When the video data distribution request is received from the mobile station, the possibility determining module determines whether to perform distribution in response to the video data distribution request on the basis of the wireless transmission capacity required for distributing the requested video data and the wireless transmission capacity that is managed by the wireless transmission capacity managing module and is available at this point of time. The execution control module notifies the mobile station of a result of possibility determination about distribution, and controls whether to distribute the video data, on the basis of the result of possibility determination. Accordingly, whether distribution can be performed or not in response to the video data distribution request can be appropriately determined based on the wireless transmission capacity required for distributing the requested video data and the managed wireless transmission capacity that is available at this point of time, the result of possibility determination about distribution can be communicated to the mobile station which is the source of request, and whether the video data can be distributed or not can be appropriately controlled based on the result of possibility determination. Specifically, quality deterioration can be prevented from occurring and video distribution can be performed smoothly.

Furthermore, it is desired that the base station according to the present invention have: inquiry module for sending, to a transmitted-data capacity management device that manages a wireless transmission capacity being used for distribution performed by a plurality of base stations including the abovementioned base station, an inquiry about a base station capable of performing distribution of the video data in response to the video data distribution request, when it is determined by the possibility determining module that distribution cannot be performed; and possible base station notifying module for notifying the mobile station of the base station capable of performing the distribution, the base station being replied in response to the inquiry sent from the inquiry module. In such a configuration, when it is determined by the possibility determining module that distribution can be performed, the inquiry module inquires the transmitted-data capacity management device about a base station capable of performing the distribution in response to the video data distribution request, and the possible base station notifying module notifies the mobile station, which is the source of request, of the base station capable of distribution, which is replied in response to the inquiry. Therefore, even when it is determined that distribution cannot be performed, the mobile station, which is the source of request, can acquire information on the base station capable of performing the distribution in response to the video data distribution request.

Moreover, it is preferred that the base station according to the present invention have distributed video notifying module for notifying the mobile station, which is the source of request, of information on the video data that is being distributed by the abovementioned base station at that point of time when the possibility determining module determines that distribution cannot be performed. In such a configuration, when the possibility determining module determines that distribution cannot be performed, the distributed video notifying module notifies the mobile station of the information on the video data that is being distributed by the abovementioned base station at that point of time. Therefore, the mobile station, which is the source of request, can acquire the information on the video data that is being distributed by the base station at that point of time.

In addition, it is desired that the base station according to the present invention further have: video data request module for requesting the distribution server to provide the requested video data, when the possibility determining module determines that distribution cannot be performed and when the requested video data is not being distributed at that point of time; and distribution control module for distributing the video data provided by the distribution server in response to the request, to the mobile station. In such a configuration, when the possibility determining module determines that distribution cannot be performed, and when the requested video data is not being distributed at that point of time, the video data request module requests the distribution server to provide the requested video data, and the distribution control module distributes the video data provided by the distribution server in response to the request, to the mobile station. Therefore, even when the possibility determining module determines that distribution cannot be performed and when the requested video data is not being distributed at that point of time, the video data provided by the distribution server is automatically distributed to the mobile station which is the source of request.

The invention related to the base station described above can be viewed as an invention related to the following video distribution system and an invention related to the following distribution control method, and achieves the same operation and effect.

Specifically, the video distribution system related to the present invention is a video distribution system comprising: a mobile station; a distribution server that accumulates and provides video data to be distributed; a base station that has a function to distribute the video data provided by the distribution server to the mobile station that is located in a wireless area managed by the base station, on the basis of a video data distribution request sent from the mobile station; and a transmitted-data capacity management device that manages a wireless transmission capacity that is being used for distribution performed by a plurality of base stations, wherein the base station has: wireless transmission capacity managing module for managing a wireless transmission capacity that is available for distributing the video data; possibility determining module for, when a video data distribution request is received from the mobile station, determining whether distribution can be performed in response to the video data distribution request, on the basis of the wireless transmission capacity required for distributing the requested video data and the wireless transmission capacity that is managed by the wireless transmission capacity managing module and is available at this point of time; execution control module for notifying the mobile station of a result of possibility determination about distribution, which is made by the possibility determining module, and for controlling the possibility of distribution of the video data on the basis of the result of possibility determination; inquiry module for sending an inquiry about a base station capable of performing distribution of the video data in response to the video data distribution request, to the transmitted-data capacity management device, when it is determined by the possibility determining module that distribution cannot be performed; and possible base station notifying module for notifying the mobile station of the base station capable of performing the distribution, the base station being replied in response to the inquiry sent from the inquiry module, and wherein the transmitted-data capacity management device has: possible base station selecting module for selecting base stations capable of performing the distribution in response to the video data distribution request, on the basis of the wireless transmission capacity required for distributing the requested video data and the wireless transmission capacity that is being used for distribution performed by the plurality of base stations; and reply module for replying the base stations that are capable of performing the distribution and selected by the possible base station selecting module, to the base station that sent the inquiry.

It is desired that the video distribution system related to the present invention further have: video data request module for requesting the distribution server to provide the requested video data, when the possibility determining module determines that distribution can be performed and when the requested video data is not being distributed at that point of time; and distribution control module for distributing the video data provided by the distribution server in response to the request, to the mobile station, and that the distribution server have video data providing module for providing the video data to the base station in response to the request for provision of the video data, which is received from the video data request module.

The distribution control method according to the present invention is a distribution control method in the video distribution system having: a mobile station; a distribution server that accumulates and provides video data to be distributed; a base station that has a function to distribute the video data provided by the distribution server to the mobile station that is located in a wireless area managed by the base station, on the basis of a video data distribution request sent from the mobile station; and a transmitted-data capacity management device that manages a wireless transmission capacity that is being used for distribution performed by a plurality of base stations, wherein the distribution control method has: a possibility determining step in which, when the video data distribution request is received from the mobile station, the base station determines whether distribution can be performed in response to the video data distribution request, on the basis of the wireless transmission capacity required for distributing the requested video data and the wireless transmission capacity that is available at this point of time; a determination result notifying step in which the base station notifies the mobile station of a result of possibility determination about distribution, which is made in the possibility determining step; an inquiring step in which the base station sends an inquiry about a base station capable of performing the distribution in response to the video data distribution request, to the transmitted-data capacity management device, when it is determined that distribution cannot be performed; a possible base station selecting step in which the transmitted-data capacity management device selects base stations capable of performing the distribution in response to the video data distribution request, on the basis of the wireless transmission capacity required for distributing the requested video data and the wireless transmission capacity that is being used for distribution performed by the plurality of base stations; a replying step in which the transmitted-data capacity management device replies the selected base stations capable of performing the distribution, to the base station that sent the inquiry; and a possible base station notifying step in which the base station notifies the mobile station of the replied base stations capable of performing the distribution.

According to the present invention, in the video distribution service for a mobile communication network where a plurality of mobile stations share transmission capacity of a wireless zone, quality deterioration can be prevented from occurring and video distribution can be performed smoothly.

DESCRIPTION OF THE PREFERRED EMBODIMENTS

Hereinafter, the embodiment of the present invention is described with reference to the drawings.

[Configuration of the Video Distribution System]

Figure 1:
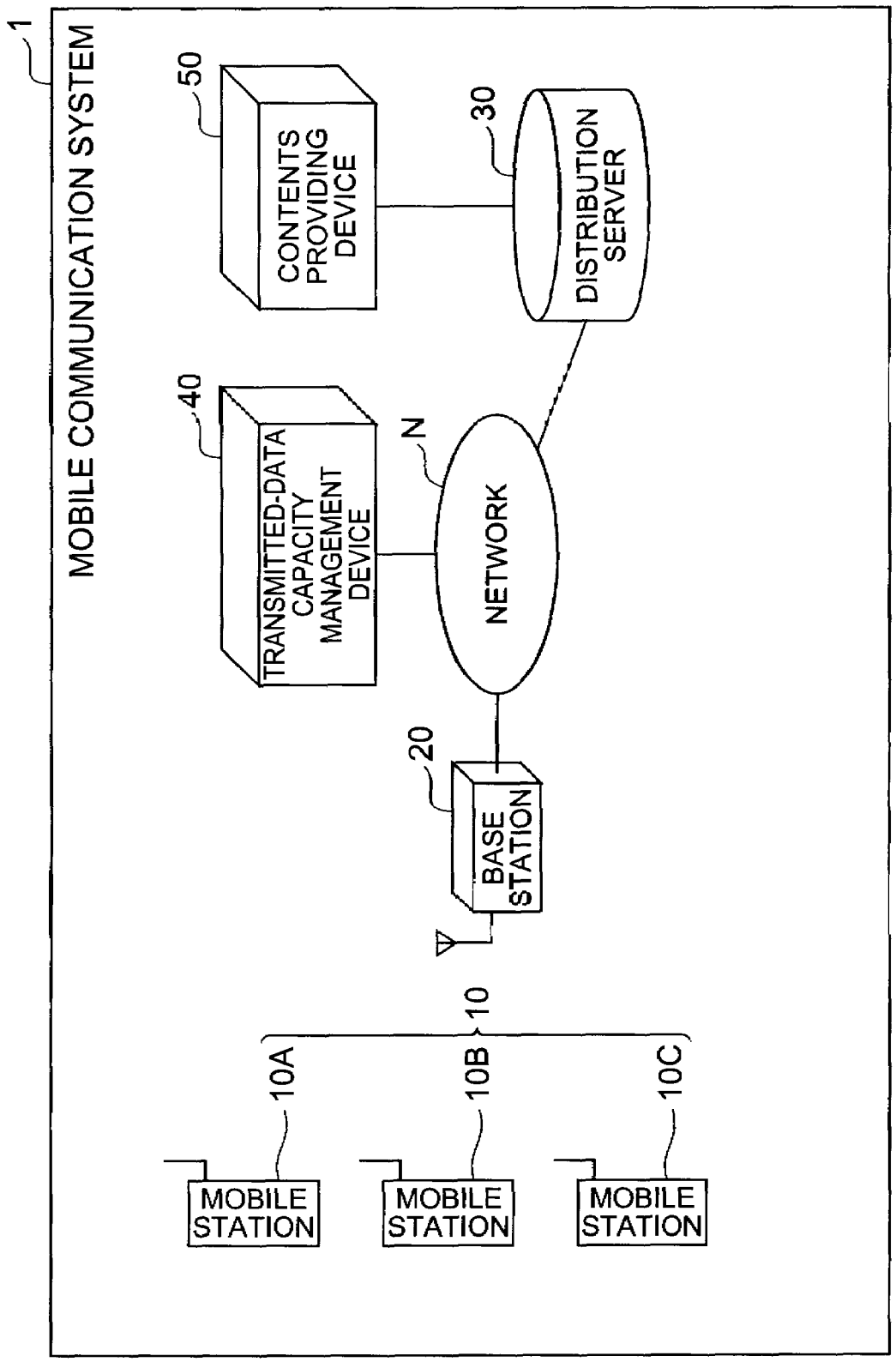
FIG. 1 is a configuration diagram showing the entire video distribution system according to an embodiment of the present invention.

First, a configuration of a video distribution system 1 according to the present embodiment is described with reference to FIG. 1. FIG. 1 shows an image of the entire video distribution system 1. The video distribution system 1 is a system for implementing a video distribution service in a mobile communication network, and is constituted by a plurality of mobile stations 10A, 10B and 10C (generically called "mobile station 10" hereinafter), a base station 20 that provides means to wirelessly connect the mobile station 10 to a network N, a distribution server 30 that distributes video data via the network N, a transmitted-data capacity management device 40 that manages data capacity of video data (referred to as "video data capacity" hereinafter) transmitted by the base station 20, and a contents providing device 50 that creates/records video data and provides the distribution server 30 with the video data. It should be noted that although FIG. 1 shows the single base station 20 only, the video distribution system 1 has a plurality of base stations 20, and the transmitted-data capacity management device 40 manages the video data capacity of each of the plurality of base stations 20. Also, the network N is not necessarily a single network, and therefore may have a plurality of networks such as a core network of a mobile communication network or Internet network.

Figure 2:
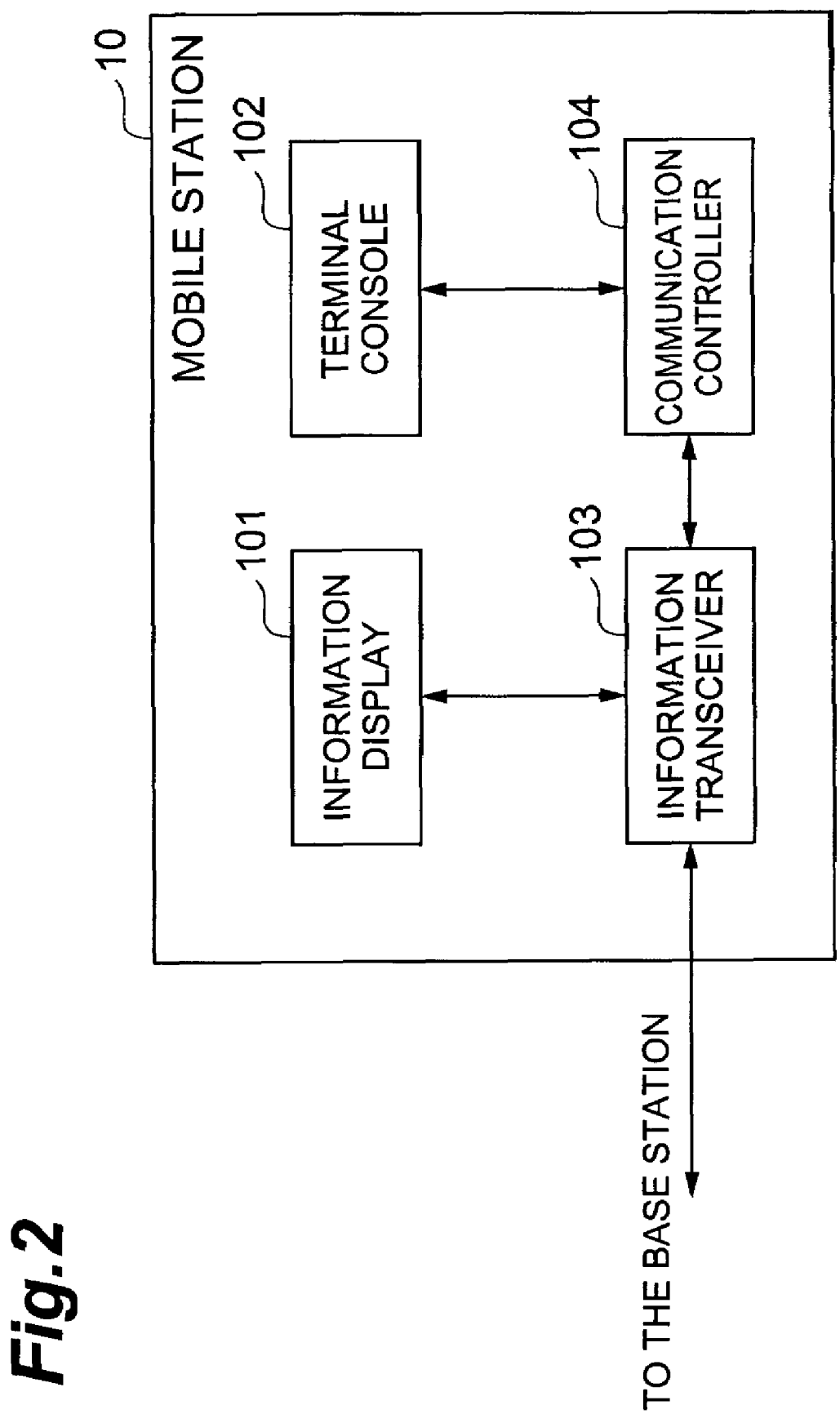
FIG. 2 is a configuration diagram of a mobile station.

Next, a configuration of the mobile station 10 is described with reference to FIG. 2. As shown in FIG. 2, the mobile station 10 is constituted by an information display 101, a terminal console 102, an information transceiver 103, and a communication controller 104.

The information display 101 displays a list of identification information items of distributable video data, which is exhibited in the distribution server 30. Also, the information display 101 reproduces video data that is received by the information transceiver 103 via the network N. Moreover, when unable to reproduce video data requested by the mobile station 10, the information display 101 displays a list of identification information of reproducible video data distributed by the base station 20, or information on a base station capable of reproducing desired video data (referred to as "reproduction-capable base station" hereinafter), the information being issued by the transmitted-data capacity management device 40.

The terminal console 102 transmits instruction information sent by a user through button operation, to the communication controller 104.

The information transceiver 103 receives the list of identification information items of distributable video data, which is exhibited in the distribution server 30, and the video data received via the network N, and transfers the list and video data to the information display 101. Furthermore, when unable to reproduce the video data requested by the mobile station 10, the information transceiver 103 receives the list of identification information of reproducible video data distributed by the base station 20, or information on the reproduction-capable base station that is issued by the transmitted-data capacity management device 40, and transfers the list and information to the information display 101. In addition, the information transceiver 103 receives a notification on that there is no request for distribution of video data that is requested to be reproduced, or no video data that is requested to be reproduced, from the communication controller 104, and transmits such notification to the base station 20.

In the case in which the terminal console 102 inputs the presence or absence of the video data that is requested to be reproduced, the communication controller 104 creates a message for requesting for distribution of such video data (referred to as "distribution request message" hereinafter), or a message for notifying that there is no video data that is requested to be reproduced, and then transfers the created distribution request message to the information transceiver 103.

Figure 3:
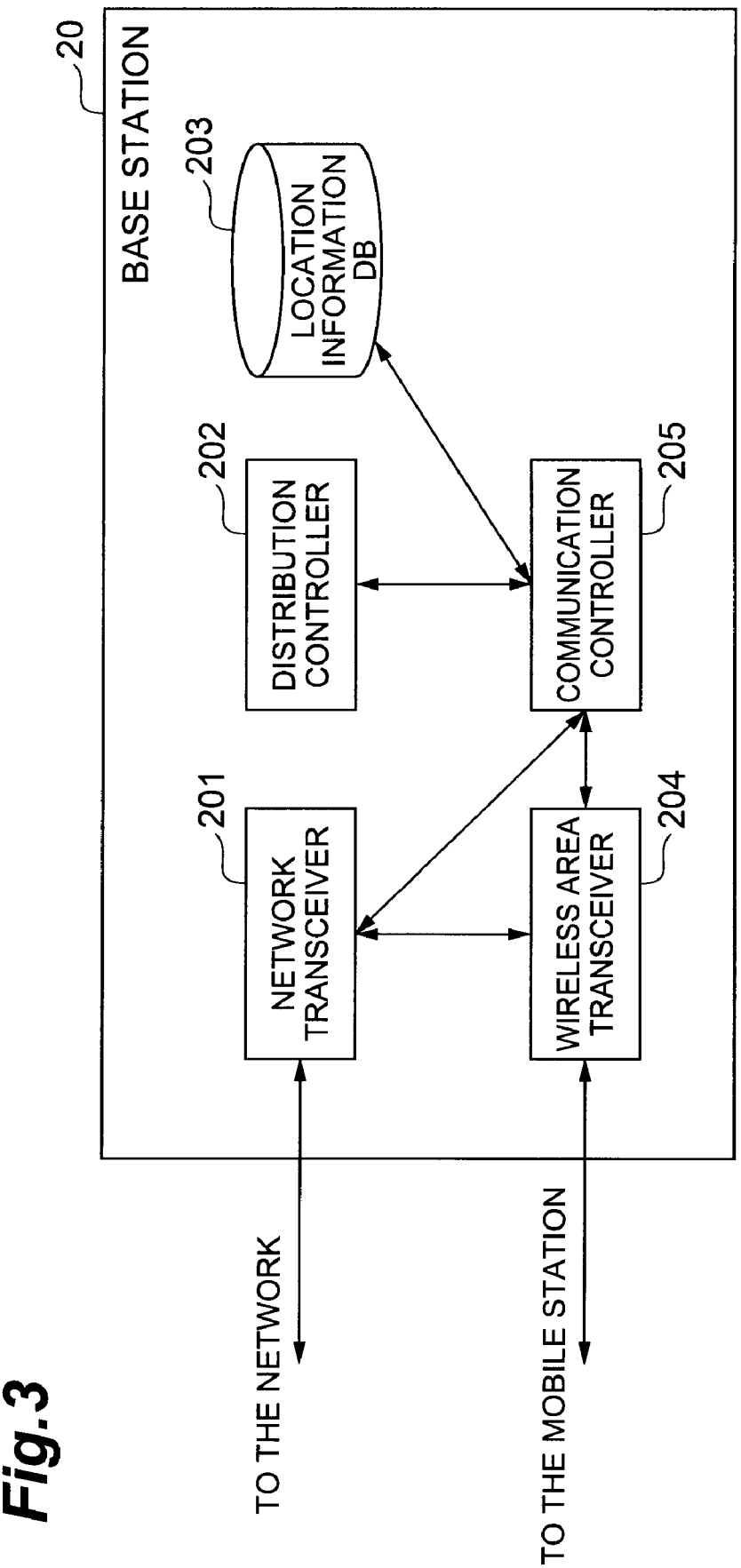
FIG. 3 is a configuration diagram of a base station.

Next, a configuration of the base station 20 is described with reference to FIG. 3. As shown in FIG. 3, the base station 20 is constituted by a network transceiver 201, a distribution controller 202, a location information DB 203, a wireless transceiver 204, and a communication controller 205.

The network transceiver 201 receives the video data identification information list, video data, and information on the reproduction-capable base station via the network N, and transfers these items to the wireless transceiver 204. Also, in the case in which the network transceiver 201 receives a distribution request message from the communication controller 205, the network transceiver 201 transfers the distribution request message to the distribution server 30 via the network N. Furthermore, in the case in which the network transceiver 201 receives a message for inquiring about a location where the video data desired by the mobile station 10 can be reproduced, the message being sent from the communication controller 205 to the transmitted-data capacity management device 40, the network transceiver 201 transfers the inquiry message to the network N. Moreover, in the case in which the network transceiver 201 receives from the communication controller 205 information on a wireless transmission capacity, which is used when the base station 20 performs distribution, the network transceiver 201 transmits the information on the wireless transmission capacity, which is used for distribution, to the transmitted-data capacity management device 40 via the network N.

In the case in which the distribution controller 202 receives a distribution request message from the communication controller 205, the distribution controller 202 confirms that video data identification information that is distributed by a base station 20. In the case in which the distribution request message is not a request for the video data that is distributed by the base station 20, the distribution controller 202 confirms the wireless transmission capacity that is available to the base station 20 at that moment. The distribution controller 202 then determines whether the video data that is requested to be reproduced can be distributed or not, on the basis of the wireless transmission capacity required in distribution of the video data that is requested to be reproduced, as well as the wireless transmission capacity that is available to the base station 20 at that moment. When the distribution controller 202 determines that distribution can be performed, the distribution controller 202 registers/stores video data identification information related to the distribution request message, and sends the distribution request message back to the communication controller 205. In the case in which the video data requested by the mobile station 10 cannot be reproduced, the distribution controller 202 transfers the video data identification information that is being distributed by the base station 20, to the communication controller 205. Also, the distribution controller 202 calculates the wireless transmission capacity being used for distribution in order to periodically notify the transmitted-data capacity management device 40 of the video data capacity that is being transmitted by the base station 20, and then notifies the communication controller 205 of the calculated wireless transmission capacity being used for distribution.

The location information DB 203 manages information on the location of the base station 20. This location information is set beforehand and referenced by the communication controller 205 according to need.

The wireless transceiver 204 receives the video data identification information list, video data, and information on a reproduction-capable base station from the network transceiver 201, and transfers these items to the mobile station 10. Also, in the case in which a distribution request message or a message for notifying that there is no video data the mobile station 10 requests for reproduction is received from the mobile station 10, the wireless transceiver 204 transfers such message to the communication controller 205.

In the case in which the communication controller 205 receives the distribution request message from the wireless transceiver 204, the communication controller 205 sends the received distribution request message to the distribution controller 202. Furthermore, in the case in which the distribution request message is returned from the distribution controller 202, the communication controller 205 transfers this distribution request message to the network transceiver 201. Also, in the case in which the communication controller 205 receives from the distribution controller 202 the video data identification information that is being distributed by the base station 20, the communication controller 205 transfers this distributed video data identification information to the wireless transceiver 204. In the case in which the distribution controller 202 communicates the video data capacity that is being transmitted by the base station 20, the communication controller 205 refers to the location information of the base station 20 by means of the location information DB 203, and transmits the location information of the base station 20 and the video data capacity information that is being transmitted by the base station 20, to the network transceiver 201. The transmitted-data capacity management device 40 is notified of the transmitted location information of the base station 20 and the video data capacity information. Furthermore, once the communication controller 205 receives, from the wireless transceiver 204, the message for notifying that there is no video data that is requested by the mobile station 10 to be reproduced, if the video data requested by the mobile station 10 cannot be reproduced, the communication controller 205 transmits an inquiry message for inquiring the transmitted-data capacity management device 40 about a base station capable of reproducing the video data (reproduction-capable base station), to the network transceiver 201, in order to communicate information on the reproduction-capable base station to the mobile station 10.

It should be noted that the requirements for the configuration of the base station according to the present invention are respectively associated with the sections of the abovementioned base station 20 in the following manner. Specifically, the wireless transmission capacity managing module and the possibility determining module each corresponds to the distribution controller 202, and the inquiry module corresponds to a configuration having the communication controller 205 and the network transceiver 201. Also, the possible base station notifying module and the distribution control module each corresponds to a configuration having the communication controller 205 and the wireless transceiver 204. Moreover, the execution control module and the distributed video notifying module each corresponds to a configuration having the distribution controller 202, the communication controller 205, and the wireless transceiver 204. The video data request module corresponds to a configuration having the distribution controller 202, the communication controller 205, and the network transceiver 201.

Figure 4:
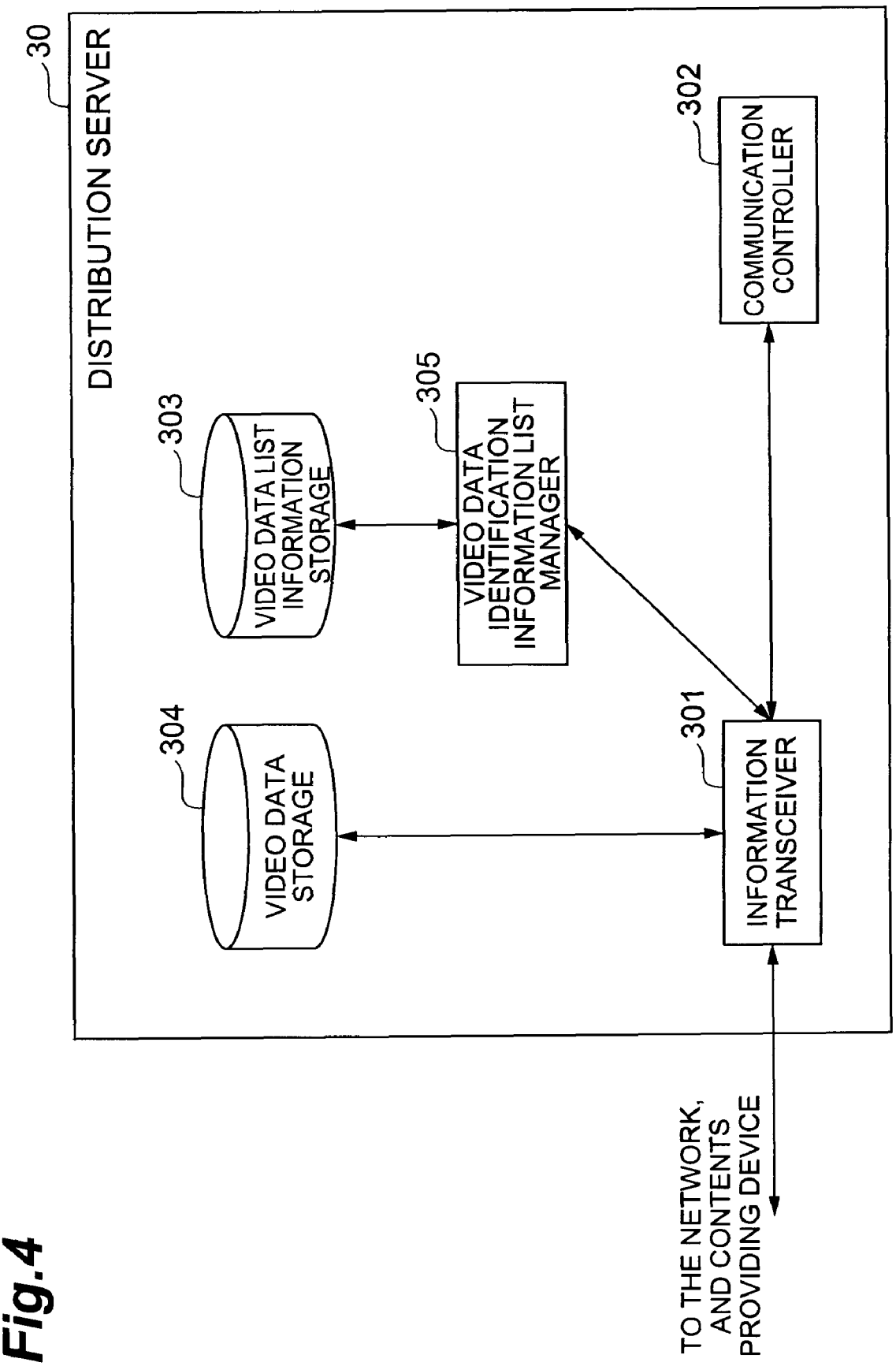
FIG. 4 is a configuration diagram of a distribution server.

Next, a configuration of the distribution server 30 is described using FIG. 4. As shown in FIG. 4, the distribution server 30 is constituted by an information transceiver 301, a communication controller 302, a video data identification information list storage 303, a video data storage 304, and a video data identification information list manager 305.

The information transceiver 301 transfers video data, which is received from the contents providing device 50, to the video data storage 304, and transfers identification information related to the video data (referred to as "video data information" hereinafter) to the video data identification information list manager 305. The information transceiver 301 further transfers the distribution request message, which is received from the network N, to the communication controller 302, requests the video data storage 304 to transmit the requested video data, and transmits the video data obtained in response to the request to the network N.

The communication controller 302 receives the distribution request message from the information transceiver 301, and manages the video data that is being distributed.

The video data identification information list storage 303 receives the video data information from the video data identification information list manager 305, and saves and manages the received video data.

The video data storage 304 stores video data created by the contents providing device 50, and, in accordance with the request from the information transceiver 301, starts distributing the video data that is obtained in response to the request.

The video data identification information list manager 305 receives a video data identification information list from the information transceiver 301, and transfers the video data identification information list to the video data identification information list storage 303.

Figure 5:
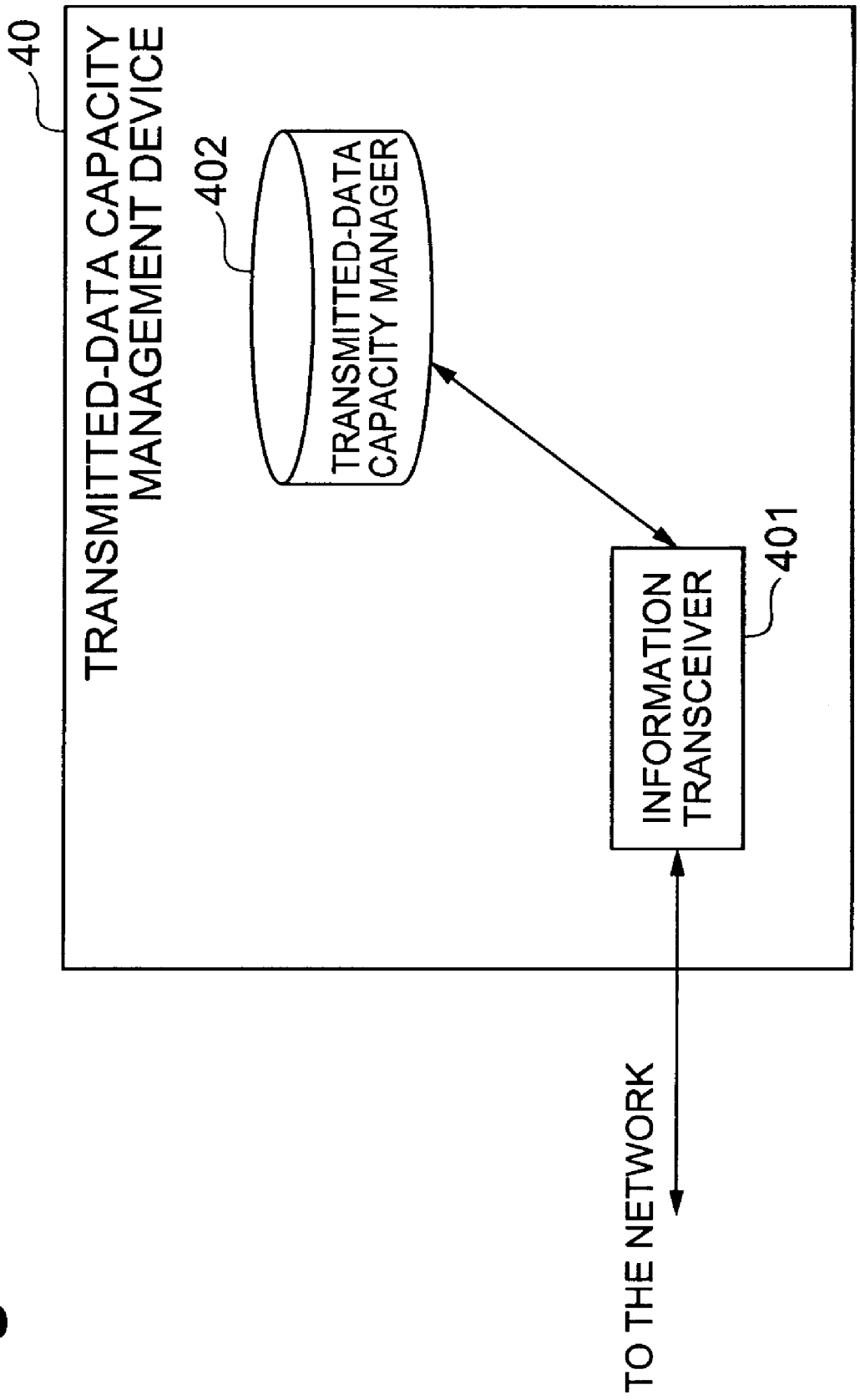
FIG. 5 is a configuration diagram of a transmitted-data capacity management device.

Next, a configuration of the transmitted-data capacity management device 40 is described using FIG. 5. As shown in FIG. 5, the transmitted-data capacity management device 40 is constituted by an information transceiver 401 and a transmitted-data capacity manager 402.

When wireless transmission capacity information that is being used for distribution by each base station 20 is communicated from each base station 20, the information transceiver 401 transfers the wireless transmission capacity information that is being used for distribution by each base station 20, to the transmitted-data capacity manager 402. Also, the information transceiver 401 manages the location information (latitude/longitude information) of each base station 20. When an inquiry about a reproduction-capable base station and the location information of the base station 20 that sent the inquiry are received from the base station 20, the information transceiver 401 communicates the received inquiry, the location information of the inquiry source base station 20 and the location information of each base station 20, to the transmitted-data capacity manager 402, and obtains the information on the reproduction-capable base station from the transmitted-data capacity manager 402.

In the case in which the information on the wireless transmission capacity that is being used for distribution in each base station 20 is received from the information transceiver 401, the transmitted-data capacity manager 402 stores, beforehand, the received information on the wireless transmission capacity that is being used for distribution. Furthermore, in the case where the transmitted-data capacity manager 402 receives the inquiry about the reproduction-capable base station, the location information on the inquiry source base station 20, and the location information on each base station 20, the transmitted-data capacity manager 402 selects a base station that is located on the periphery of the inquiry source base station 20 and capable of reproduce the desired video data, on the basis of the information on the wireless transmission capacity that is stored in the transmitted-data capacity manager 402 and is being used for distribution in each base station 20, and communicates the information on this base station to the information transceiver 401.

It should be noted that the requirements for the configuration of the transmitted-data capacity management device according to the present invention are respectively associated with the sections of the abovementioned transmitted-data capacity management device 40 in the following manner. Specifically, the base station selecting module of the transmitted-data capacity management device related to the present invention corresponds to the transmitted-data capacity manager 402, and the replay module corresponds to the information transceiver 401.

Figure 6:
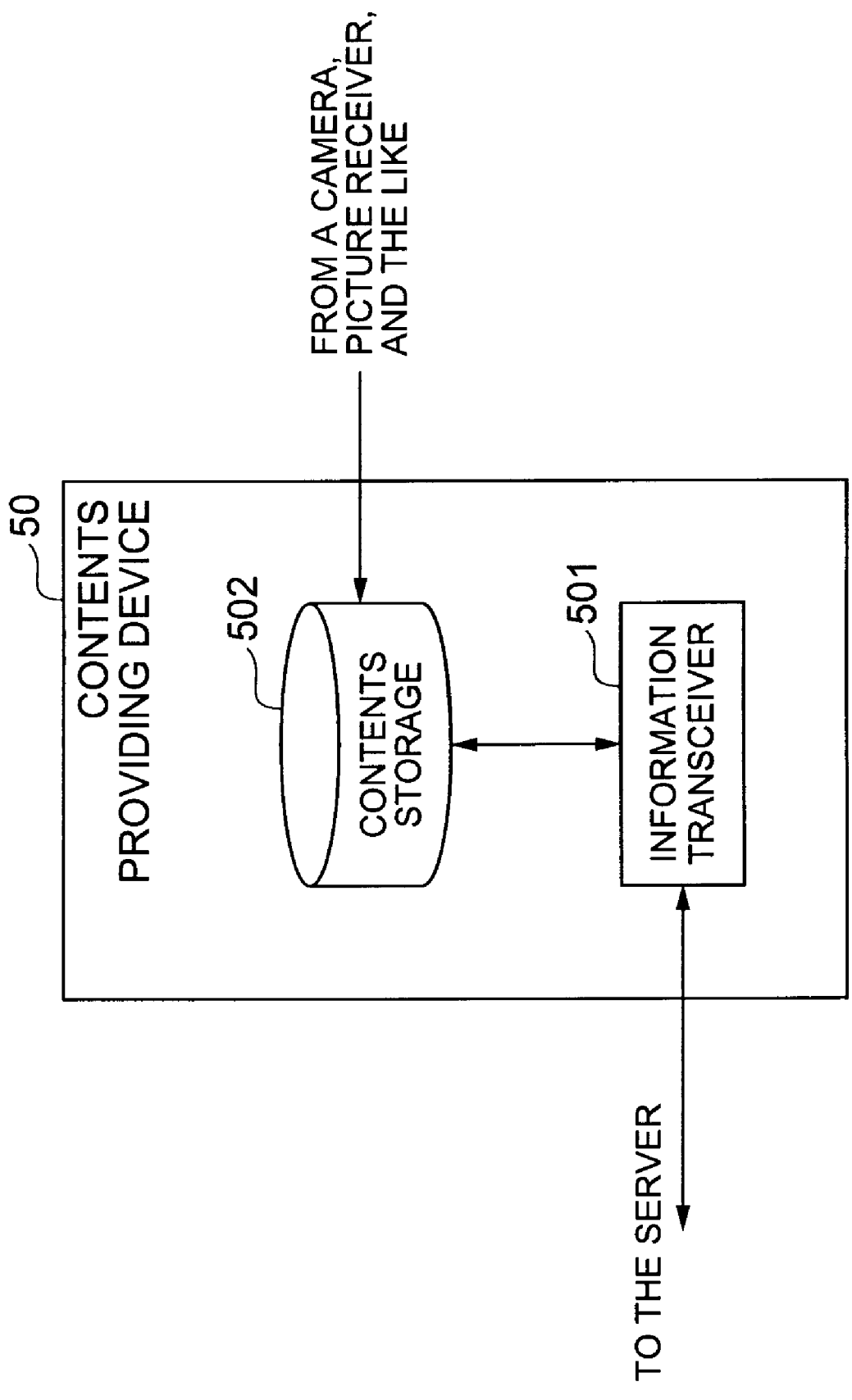
FIG. 6 is a configuration diagram of a contents providing device.

Next, a configuration of the contents providing device 50 is described using FIG. 6. As shown in FIG. 6, the contents providing device 50 is constituted by an information transceiver 501 and a contents storage 502.

The information transceiver 501 transfers video data that is registered in the contents storage 502 to the distribution server 30.

The contents storage 502 stores video data that is created and recorded using a camera or a picture receiver, and transfers the video data to the information transceiver 501.

Figure 7:
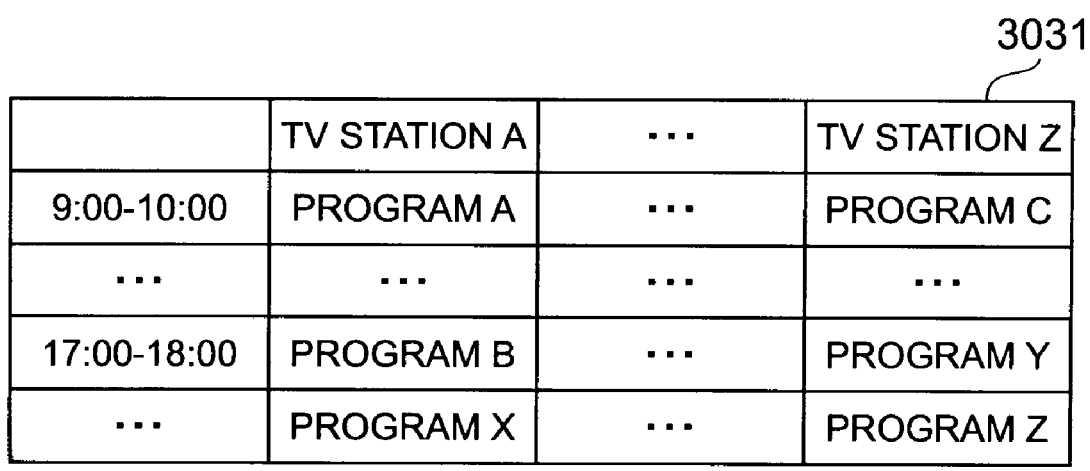
FIG. 7 is a figure showing an example of a video data identification information list.

The video data identification information list storage 303 of the distribution server 30 stores, for example, a video data identification information list 3031 shown in FIG. 7. This video data identification information list 3031 contains a starting time for video data, a name of a company providing the video data, and a title of the video data. This video data identification information list 3031 is updated when video data is registered in the video data storage 304 of the distribution server 30.

Figure 8:
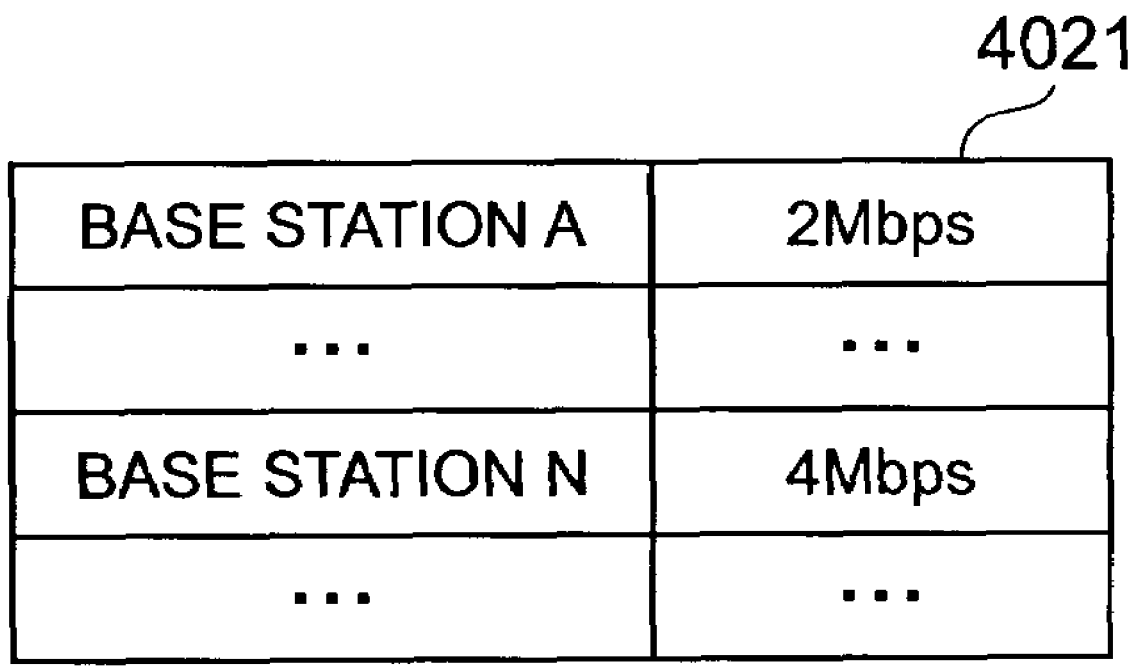
FIG. 8 is a figure showing an example of transmitted-data capacity management information.

Further, the transmitted-data capacity manager 402 of the transmitted-data capacity management device 40 stores, for example, transmitted-data capacity management information 4021 shown in FIG. 8. This transmitted-data capacity management information 4021 is information for managing the volume of wireless transmission capacity used as video data in each base station 20. This transmitted-data capacity management information 4021 is updated by a periodic report from each base station 20.

Figure 9:
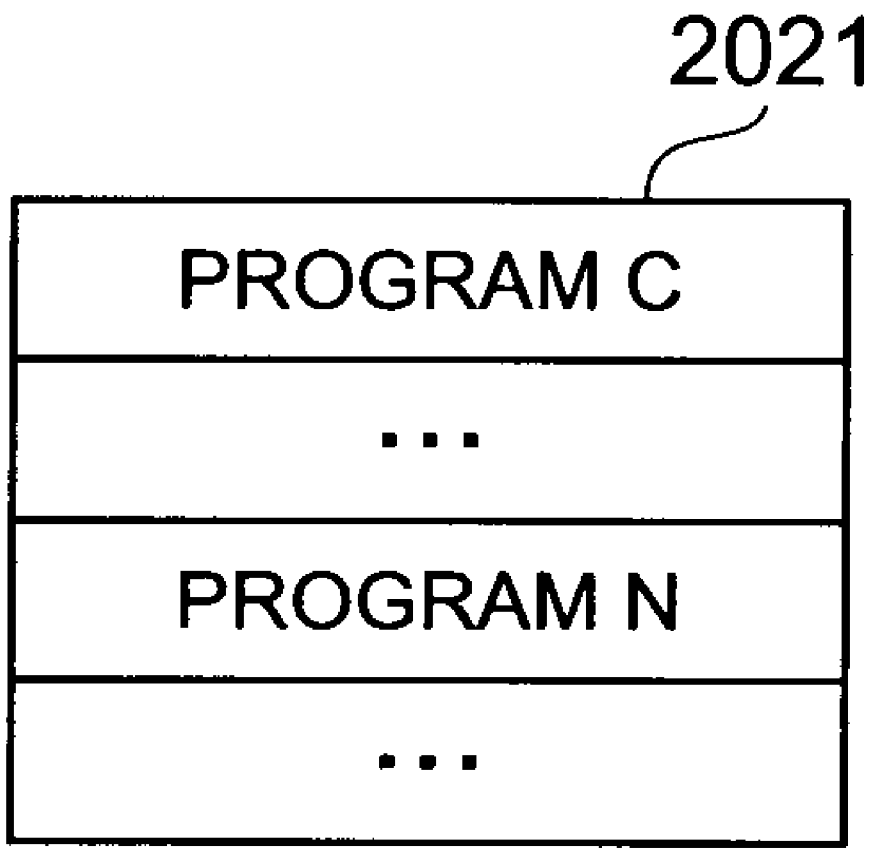
FIG. 9 is a figure showing an example of the video data identification information.

Furthermore, the distribution controller 202 of the base station 20 manages, for example, video data identification information 2021 shown in FIG. 9. In this video data identification information 2021, information on the title of video data and the like, such as identification information on video data that is being distributed in each base station 20, is registered. When the base station 20 determines, in response to a distribution request made by the mobile station 10, to distribute video data related the distribution request, identification information of this video data is added to the video data identification information 2021. Also, when distribution of the video data is completed, the identification information of the video data is deleted from the video data identification information 2021.

Figure 10:
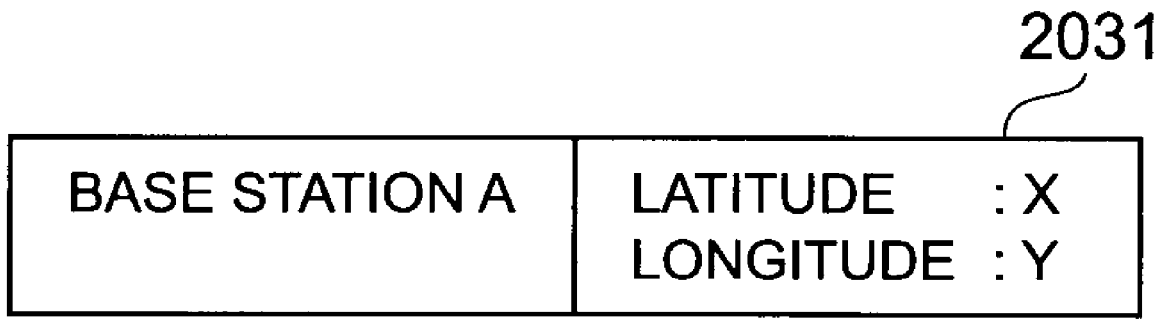
FIG. 10 is a figure showing an example of location information of the base station.

Moreover, the name of the base station, and latitude/longitude information as position information shown in FIG. 10, for example, are stored in the location information DB 203 of the base station 20. These information items are manually set when the base station 20 is installed and then communicated to the transmitted-data capacity management device 40 at the time of setting. The set location information of each base station 20 is managed in the location information DB 203 of each base station 20, and managed in the information transceiver 401 within the transmitted-data capacity management device 40.

[Processing Operations in the Video Distribution System]

Figure 11:
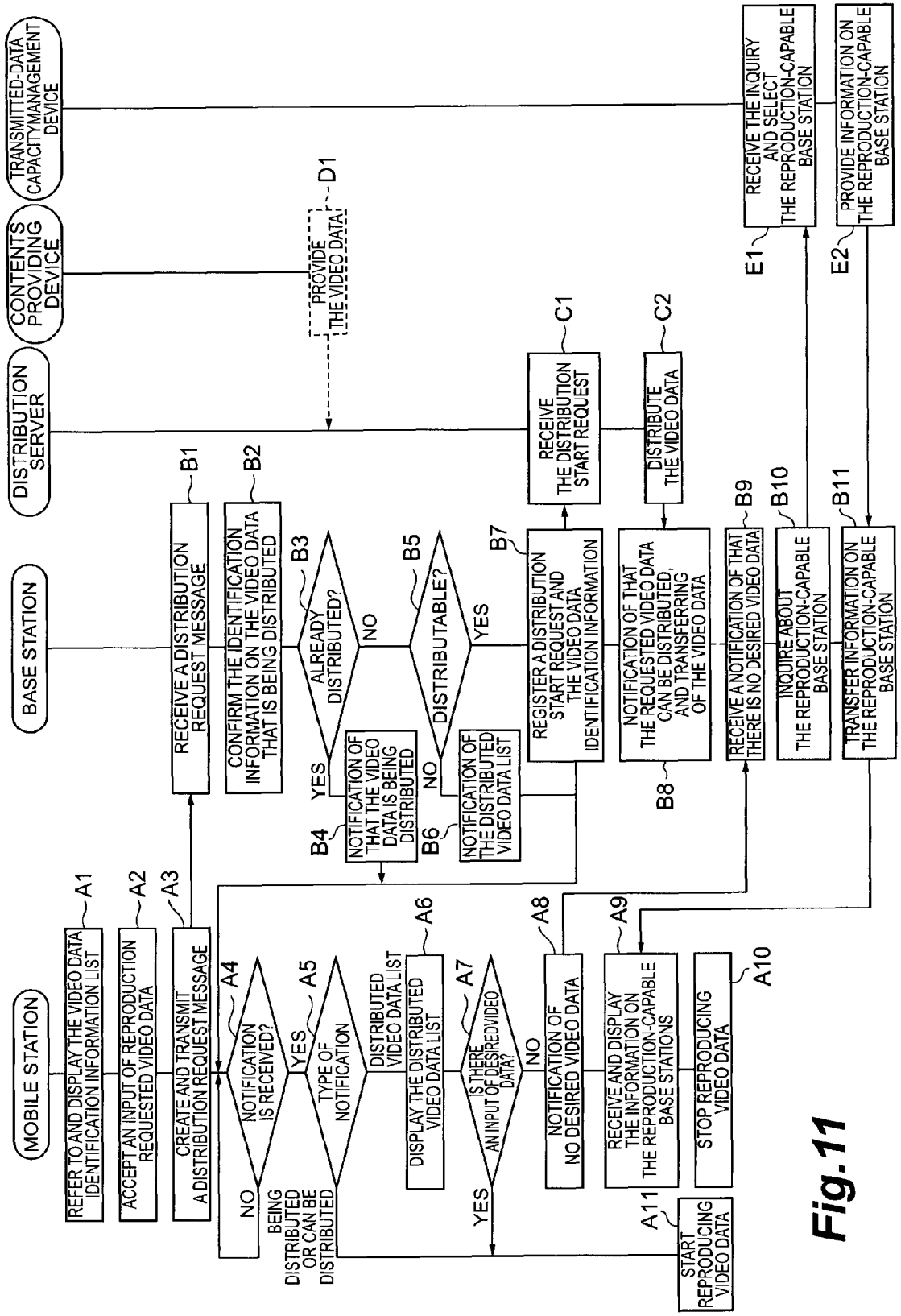
FIG. 11 is a figure showing a process flow in the embodiment of the present invention.

Next, a processing operation performed in the video distribution system 1 related to the present embodiment is described using FIG. 11.

In order to operate the video distribution system 1 related to the present embodiment, the mobile station 10 refers to and displays the video data identification information list disclosed by the distribution server 30 (Step A1). Here, the video data identification information list is provided by reading, for example, WEB information, a mail, an electronic TV program guide, bar code information, and the like.

Once a user of the mobile station 10 views the displayed video data identification information list, and selects video data requested to be reproduced (referred to as "reproduction requested video data" hereinafter), the mobile station 10 accepts an input of the reproduction requested video data by means of the terminal console 102 (Step A2) creates a distribution request message for requesting for distribution of the reproduction requested video data, and transmits the created distribution request message to the base station 20 (Step A3).

The base station 20 receives the distribution request message from the mobile station 10 (Step B1), and then confirms the video data identification information 2021 (FIG. 9) that is being distributed in the wireless area managed by the base station 20 (Step B2).

At this moment, in the case in which the reproduction requested video data is already distributed (when the answer in Step B3 is Yes), the mobile station 10 is notified by the base station 20 of that the reproduction requested video data is already distributed (Step B4). If the mobile station 10 receives such notification, the answer Yes is obtained in Step A4, the determination in Step A5 is reported as "being distributed", and thereby reproduction of video data is started (Step A11).

On the other hand, in the case in which the reproduction requested video data is not being distributed in Step B3, the base station 20 determines whether it is possible to distribute the reproduction requested video data, on the basis of the wireless transmission capacity required for distributing the reproduction requested video data, and the wireless transmission capacity that is available in the base station 20 at the moment (Step B5). Specifically, if the wireless transmission capacity required for distributing the reproduction requested video data is equal to or smaller than the available wireless transmission capacity, it is determined that the reproduction requested video data can be distributed, but if the wireless transmission capacity required for distributing the reproduction requested video data is larger than the available wireless transmission capacity, it is determined that the reproduction requested video data cannot be distributed.

At this moment, in the case in which it is determined that the reproduction requested video data can be distributed, the base station 20 requests the distribution server to start distributing the reproduction requested video data, and registers the identification information on the video data, which is requested for distribution, in the video data identification information 2021 shown in FIG. 9 (Step B7).

Once the distribution server 30 receives the distribution request from the base station 20 (Step C1), the distribution server 30 abstracts the requested video data from the video data storage 304 and distributes the video data to the base station 20 (Step C2). It should be noted that the contents providing device 50 provides various video data to the distribution server 30 (Step D1), and the provided video data is stored in the video data storage 304 of the distribution server 30 in advance.

The base station 20 that receives distribution of the video data notifies the request source mobile station 10 of that the reproduction requested video data can be distributed, and transfers (distributes) this reproduction requested video data to the wireless area managed by the base station 20 (Step B8).

Once the request source mobile station 10 receives the notification, the answer Yes is obtained in Step A4, the determination in Step A5 is reported as "can be distributed", and thereby reproduction of the reproduction requested video data is started (Step A11).

Incidentally, in the case in which it is determined in Step B5 that the reproduction requested video data cannot be distributed, the base station 20 notifies the request source mobile station 10 of a list of video data that is being distributed by this base station 20 at that moment (Step B6).

Once the request source mobile station 10 receives the notification, the answer Yes is obtained in Step A4, the determination in Step A5 is reported as "currently distributed video data list", and the reported list of currently distributed video data is displayed to the information display 101 (Step A6).

When the user of the mobile station 10 views the displayed currently distributed video data list and selects desired video data, the mobile station 10 accepts an input of the desired video data by means of the terminal console 102 (Yes in Step A7), and starts reproducing the desired video data that is being distributed (Step A11).

On the other hand, in the case in which no desired video data is input in Step A7, the mobile station 10 notifies the base station 20 of that there is no desired video data in the currently distributed video data (Step A8).

Once the base station 20 receives the notification of that there is no desired data in the currently distributed video data (Step B9), the base station 20 inquires the transmitted-data capacity management device 40 about a base station that is located on the periphery of the base station 20 and is capable of reproducing the reproduction requested video data that is related to the distribution request message received in Step B1 (Step B10). At this moment, the base station 20 abstracts the location information thereof (i.e., latitude/longitude information) from the location information DB 203, and transmits the abstracted location information and the above inquiry to the transmitted-data capacity management device 40.

Once the transmitted-data capacity management device 40 receives the inquiry and the location information of the inquiry source base station 20, the transmitted-data capacity management device 40 first selects base stations capable of reproducing the reproduction requested video data, on the basis of the wireless transmission capacity required for distributing the reproduction requested video data and the wireless transmission capacity that is being used in distribution in a plurality of base stations managed by the transmitted-data capacity management device 40. The transmitted-data capacity management device 40 further selects a base station located on the periphery of the inquiry source base station 20, from among the selected base stations on the basis of the received location information on the inquiry source base station 20 and the location information on each of the previously managed base stations 20 (Step E1). For example, the transmitted-data capacity management device 40 compares the wireless transmission capacity that is obtained from the wireless transmission capacity being used for distribution in the plurality of base stations and is available in each of the base stations, with the wireless transmission capacity required for distributing the reproduction requested video data, and selects, as reproduction-capable base stations, the base stations whose available wireless transmission capacities are equal to or larger than the wireless transmission capacity required for distributing the reproduction requested video data. Then, the transmitted-data capacity management device 40 selects a base station that is located within a predetermined range from the position of the inquiry source base station 20, from the selected reproduction-capable base stations, on the basis of the location information on the inquiry source base station 20 and the location information on each of the previously managed base stations 20. After performing such selection described above, the transmitted-data capacity management device 40 provides (replies) the inquiry source base station 20 with the information on the selected reproduction-capable base station (Step E2).

The inquiry source base station 20 transfers the information on the replied reproduction-capable base station to the request source mobile station 10 (Step B11).

Once the request source mobile station 10 receives the information on the reproduction-capable base station, the mobile station 10 displays this information to the information display 101 (Step A9), and, since the base stations 20 that are currently connected cannot reproduce the reproduction requested video data, stops the procedures for reproducing video data (A10). It should be noted that the user of the request source mobile station 10 can obtain the information on the reproduction-capable base station, and receive distribution of the reproduction requested video data by moving to the wireless area managed by the reproduction-capable base station. In this manner, the series of processing operations performed in the video distribution system 1 is ended.

According to the embodiment of the present invention described above, whether distribution can be performed or not in response to the video data distribution request is determined appropriately on the basis of the wireless transmission capacity required for distributing the requested video data and the wireless transmission capacity that is available at that moment, the result of determination on distribution is communicated to the request source mobile station, and whether the video data can be distributed or not is appropriately controlled on the basis of the determination result. Moreover, even in the case in which it is determined that the reproduction requested video data cannot be distributed, the request source mobile station can obtain the information on video data that is currently distributed by the base station at that moment, or the information on the base station capable of performing distribution of the reproduction requested video data.

As described above, in the video distribution service in the mobile communication network in which a plurality of mobile stations share transmission capacity of a wireless area, quality deterioration can be prevented from occurring and video distribution can be performed smoothly.

[Various Modifications]

Finally, various modifications of the present embodiment are described.

According to the above embodiment, in a network in which the distribution server is connected to the base stations, it is preferred that video data be distributed in a multicast fashion. By such configuration, distribution of the same data within the network can be prevented, and transmission efficiency can be improved.

Moreover, in the above embodiment, when video data desired by the mobile station cannot be reproduced, a base station that is located on the periphery of base stations connected to the mobile station and is capable of reproducing the desired video data (reproduction-capable base station) is communicated to the mobile station. However, the location of the reproduction-capable base station or the wireless area constituted by such base station may be displayed on map data on the basis of the latitude/longitude information of the reproduction-capable base station. By this configuration, the user of the mobile station can visually determine a base station capable of reproducing the desired video data.

Moreover, in the above embodiment, the "title" of the video data is shown as the video data identification information list, but information on "a simple description", "a performer", "a genre" and the like of the video data may be displayed.

In the above embodiment, the video data that is created and recorded by the contents providing device is registered in the distribution server, but video data that is created and accumulated by a mobile station or a communication terminal connected to an external network may be registered in the distribution server. At this moment, the video data may be registered by transmitting a registration request from the mobile station or the communication terminal to the distribution server. By this configuration, the video distribution system can be constructed without limiting the distributor of the video data to the distribution server.

Also, in the above embodiment, the latitude/longitude information of each base station is stored to manage the location information of the base station, but a server other than the base station may store the location information (e.g., latitude/longitude) of the base station. For example, it is preferred to store the information in the transmitted-data capacity management device. By this configuration, the base station can concentrate on distribution of the video data, and the amount of data exchanged between the distribution server and base stations can be reduced.

Moreover, in the above embodiment, the contents providing device and the distribution server are separated in order to distinguish a video data creator from a video data distributor, but both devices may be integrated. By this configuration, the amount of data exchanged between the both devices can be reduced.

Also, in the above embodiment, acceptance of distribution of new video data is managed in the base stations in accordance with the distribution request sent from the mobile station. However, the video data distributed by each base station may be determined beforehand by the network, and only the reproducible video data identification information may be distributed under the control of the base stations without accepting any requests from the mobile station. By this configuration, unique video data that is determined beforehand can be distributed by each base station. Moreover, in the system where the distribution data is determined beforehand as described above, the records of past distribution may be accumulated by the network, and the video data in the top record may be selected preferentially as video data to be distributed. By this configuration, the probability that the selected video data matches the video data desired by the mobile station is improved.

Furthermore, in the above embodiment, the list in which the contents of video data are registered in the table showing time and distribution companies is employed as the video data identification information list managed by the distribution server. However, an order of video data items to be registered may be automatically changed in accordance with the number of times that a distribution acceptance request is received in the distribution server. By this configuration, the mobile station can easily discover popular video data.

In addition, in the above embodiment, a base station manages the video data identification information in order to recognize the video data that is being distributed by the base station. However, the number of distribution requests for video data from the mobile station may be counted and managed along with the abovementioned identification information. By this configuration, in the case where the mobile station transmits an end request to the base station when ending distribution of the video data, it is possible to recognize the number of people receiving the video data, and distribution of video data that is not received by anybody can be stopped easily.

The disclosure of Japanese Patent Application No. 2006-168959 filed Jun. 19, 2006 including specification, drawings and claims is incorporated herein by reference in its entirety.

What is claimed is:

1. A base station that has a function to distribute video data provided by a distribution server via multicast to a mobile station located in a wireless area managed by the base station in response to a video data distribution request sent from the mobile station, the base station comprising:
   a wireless transmission capacity managing module configured to manage a wireless transmission capacity available for distributing the video data;
   a determining module configured to, when the video data distribution request is received from the mobile station, determine whether distribution can be performed in response to the video data distribution request, on the basis of whether the requested video data is already distributed by the base station, a wireless transmission capacity required for distributing the requested video data, and a wireless transmission capacity managed by the wireless transmission capacity managing module and is available at a point of time that the video data distribution request is received; and
   an execution control module configured to notify the mobile station of a result of the determination about distribution, which is made by the determining module, and for controlling distribution of the video data on the basis of the result of the determination.

2. The base station according to claim 1, further comprising:
   an inquiry module configured to send, to a transmitted-data capacity management device that manages a wireless transmission capacity used for distribution performed by a plurality of base stations including the base station, an inquiry about a base station capable of performing distribution of the video data in response to the video data distribution request when it is determined by the determining module that distribution cannot be performed; and a base station notifying module configured to notify the mobile station of the base station capable of performing the distribution in response to the inquiry sent from the inquiry module.

3. The base station according to claim 1, further comprising:

a distributed video notifying module configured to notify the mobile station of information on the video data being distributed by the base station at a point of time that the video data distribution request is received when the determining module determines that distribution cannot be performed.

4. The base station according to claim 1, further comprising:

a video data request module configured to request the distribution server to provide the requested video data when the determining module determines that distribution can be performed, and when the requested video data is not distributed at the point of time that the video data distribution request is received; and a distribution control module configured to distribute the video data provided by the distribution server to the mobile station in response to the request.

5. A video distribution system, comprising:

a mobile station;

a distribution server that accumulates and provides video data to be distributed;

a base station configured to distribute the video data provided by the distribution server via multicast to the mobile station located in a wireless area managed by the base station on the basis of a video data distribution request sent from the mobile station; and a transmitted-data capacity management device that manages a wireless transmission capacity used for distribution performed by a plurality of base stations, wherein the base station includes:

a wireless transmission capacity managing module configured to manage a wireless transmission capacity available for distributing the video data;

a determining module configured to, when the video data distribution request is received from the mobile station, determine whether distribution can be performed in response to the video data distribution request, on the basis of whether the requested video data is already distributed by the base station, a wireless transmission capacity required for distributing the requested video data, and a wireless transmission capacity managed by the wireless transmission capacity managing module and is available at a point of time that the video data distribution request is received;

an execution control module configured to notify the mobile station of a result of the determination about distribution, which is made by the determining module, and control the distribution of the video data on the basis of the result of the determination;

an inquiry module configured to send an inquiry about a base station capable of performing distribution of the video data in response to the video data distribution request to the transmitted-data capacity management device when it is determined by the determining module that distribution cannot be performed; and a base station notifying module configured to notify the mobile station of the base station capable of performing the distribution in response to the inquiry sent from the inquiry module, and wherein the transmitted-data capacity management device includes:

a base station selecting module configured to select base stations capable of performing the distribution in response to the video data distribution request on the basis of the wireless transmission capacity required for distributing the requested video data and the wireless transmission capacity used for distribution performed by the plurality of base stations; and a reply module configured to inform the mobile station of the base stations capable of performing the distribution that are selected by the base station selecting module.

6. The video distribution system according to claim 5, wherein the base station further comprises:

a video data request module configured to request the distribution server to provide the requested video data when the determining module determines that distribution can be performed and when the requested video data is not distributed at the point of time that the video data distribution request is received; and a distribution control module configured to distribute the video data provided by the distribution server to the mobile station in response to the request, and wherein the distribution server comprises:

a video data providing module configured to provide the video data to the base station in response to the request for provision of the video data, which is received from the video data request module.

7. A distribution control method in a video distribution system comprising: a mobile station; a distribution server that accumulates and provides video data to be distributed; a base station that has a function to distribute the video data provided by the distribution server via multicast to the mobile station located in a wireless area managed by the base station, on the basis of a video data distribution request sent from the mobile station; and a transmitted-data capacity management device that manages a wireless transmission capacity used for distribution performed by a plurality of base stations, the method comprising:

determining by the base station, when the video data distribution request is received from the mobile station, whether distribution can be performed in response to the video data distribution request, on the basis of whether the requested video data is already distributed by the base station, the wireless transmission capacity required for distributing the requested video data, and the wireless transmission capacity available at a point of time that the video data distribution request is received;

notifying the mobile station of a result of the determination about distribution;

sending an inquiry about a base station capable of performing the distribution in response to the video data distribution request to the transmitted-data capacity management device when it is determined that distribution cannot be performed;

selecting, by the transmitted-data capacity management device, base stations capable of performing the distribution in response to the video data distribution request on the basis of the wireless transmission capacity required for distributing the requested video data and the wireless transmission capacity used for distribution performed by the plurality of base stations;

notifying, by the transmitted-data capacity management device, the selected base stations capable of performing the distribution, to the base station that sent the inquiry; and notifying, by the base station to the mobile station, of the replied base stations capable of performing the distribution.

* * * * *